United States Patent
Ikeo

(10) Patent No.: US 11,627,058 B2
(45) Date of Patent: Apr. 11, 2023

(54) MANAGEMENT DEVICE, ASSISTANCE DEVICE, MANAGEMENT METHOD, AND RECORDING MEDIUM FOR CONVERTING DATA INTO VIEWABLE FORMAT

(71) Applicant: OMRON Corporation, Kyoto (JP)

(72) Inventor: Yuji Ikeo, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/439,822

(22) PCT Filed: Feb. 27, 2020

(86) PCT No.: PCT/JP2020/008054
§ 371 (c)(1),
(2) Date: Sep. 16, 2021

(87) PCT Pub. No.: WO2020/195517
PCT Pub. Date: Oct. 1, 2020

(65) Prior Publication Data
US 2022/0094615 A1    Mar. 24, 2022

(30) Foreign Application Priority Data
Mar. 26, 2019 (JP) .............................. JP2019-058969

(51) Int. Cl.
*H04L 43/045* (2022.01)
*H04L 43/08* (2022.01)

(52) U.S. Cl.
CPC ............ *H04L 43/045* (2013.01); *H04L 43/08* (2013.01)

(58) Field of Classification Search
CPC .............................. H04L 43/045; H04L 43/08
See application file for complete search history.

(56) References Cited

U.S. PATENT DOCUMENTS

| | | | |
|---|---|---|---|
| 7,111,206 B1 * | 9/2006 | Shafer | H04L 43/08 714/48 |
| 7,694,115 B1 * | 4/2010 | Porras | H04L 63/1408 709/224 |
| 7,893,824 B2 | 2/2011 | Okada | |
| 2006/0031756 A1 | 2/2006 | Dirstine | |

(Continued)

FOREIGN PATENT DOCUMENTS

| | | |
|---|---|---|
| CN | 101394462 | 3/2009 |
| CN | 108377255 | 8/2018 |

(Continued)

OTHER PUBLICATIONS

"International Search Report (Form PCT/ISA/210) of PCT/JP2020/008054," dated May 19, 2020, with English translation thereof, pp. 1-4.

(Continued)

*Primary Examiner* — Viet D Vu
(74) *Attorney, Agent, or Firm* — JCIPRNET

(57) ABSTRACT

Provided is a management device that makes it possible for a user of a device different from the management device to smoothly assist troubleshooting in the management device. A management device 3 is a management device that manages a network including one or more nodes, and includes: a data acquisition portion that generates first data in binary format which indicates a state of the network, and a data conversion portion 326 that converts the first data into second data in viewer format.

18 Claims, 12 Drawing Sheets

(56) References Cited

U.S. PATENT DOCUMENTS

| | | | | |
|---|---|---|---|---|
| 2006/0255926 | A1* | 11/2006 | Okada | G05B 23/0267 340/505 |
| 2008/0120527 | A1* | 5/2008 | Nakamura | H04L 43/022 714/776 |
| 2009/0198651 | A1 | 8/2009 | Shiffer et al. | |
| 2013/0297965 | A1* | 11/2013 | Mensah | H04L 41/0681 714/4.1 |
| 2014/0115421 | A1* | 4/2014 | Cai | H04L 43/16 714/758 |
| 2016/0142349 | A1* | 5/2016 | Kamiyama | H04L 51/066 709/206 |
| 2017/0091200 | A1* | 3/2017 | El-Mankabady | G08B 21/02 |
| 2017/0235292 | A1* | 8/2017 | Wernersbach | G05B 19/0428 700/81 |
| 2017/0359222 | A1* | 12/2017 | Dutta | H04L 43/0811 |
| 2018/0041393 | A1 | 2/2018 | Munihanumaiah et al. | |

FOREIGN PATENT DOCUMENTS

| | | |
|---|---|---|
| JP | 2006157850 | 6/2006 |
| JP | 2006270894 | 10/2006 |
| JP | 2007088556 | 4/2007 |
| JP | 2008236307 | 10/2008 |
| JP | 2011002905 | 1/2011 |
| JP | 2011523804 | 8/2011 |
| JP | 2018124696 | 8/2018 |
| JP | 2018124697 | 8/2018 |
| WO | 2019043811 | 3/2019 |

OTHER PUBLICATIONS

"Written Opinion of the International Searching Authority (Form PCT/ISA/237) of PCT/JP2020/008054," dated May 19, 2020, with English translation thereof, pp. 1-6.

"Office Action of China Counterpart Application" with English translation thereof, dated Jun. 16, 2022, p. 1-p. 21.

"Search Report of Europe Counterpart Application", dated Nov. 21, 2022, p. 1-p. 8.

Office Action of Japan Counterpart Application, with English translation thereof, dated Nov. 15, 2022, pp. 1-6.

\* cited by examiner

FIG. 3

| | | | | |
|---|---|---|---|---|
| 1356 | 2019/3/12 13:55:20 | ⚠ mild fault | EtherCAT | node 16, unit | communicatio |
| 1018 | 2019/3/12 13:54:34 | ℹ monitor information | EtherNet/ | communication port | link-off abnorm |
| 1355 | 2019/3/12 13:04:04 | ⚠ mild fault | EtherCAT | node 16, unit | communicatio |
| 1013 | 2019/3/12 11:48:53 | ⚠ partial stop fault | EtherCAT | communication port | link-off abnorm |
| 1354 | 2019/3/12 11:48:53 | ⚠ mild | EtherCAT | | communication |
| 1011 | 2019/3/12 14:45:17 | ⚠ 部分 | | | process data a |
| 1010 | 2019/3/12 14:45:17 | ⚠ mild | | | communicatio |
| 1353 | 2019/3/12 14:45:17 | ⚠ mild | | | link-off abnor |
| 1008 | 2019/3/11 9:07:39 | ℹ monitor information | EtherCAT | node 16, unit | communicatio |
| 1352 | 2019/3/11 18:06:38 | ⚠ mild fault | EtherCAT | communication port | link-off abnor |
| 1001 | 2019/3/11 14:38:51 | ⚠ partial stop fault | EtherCAT | communication port | link-off abnor |
| 1000 | 2019/3/11 14:38:48 | ⚠ partial stop fault | EtherCAT | master | network config |
| 0999 | 2019/3/11 14:38:47 | ⚠ mild fault | | | |

(Dialog overlay: "display only events at date and / cancel date filter / display EtherCAT configuration")

FIG. 4

| generation source | generation source detail | event name | event code |
|---|---|---|---|
| EtherCAT | node 16 NX-EC | process data abnormality | 0x84200000 |
| EtherCAT | node 16 NX-EC | slave application abnormality | 0x84280000 |
| EtherCAT | node 16, unit | unit configuration collation abnormality | 0x35010000 |
| EtherCAT | commun... | display only events at date and time thereafter | |
| EtherCAT | node 16 | display only events at date and time thereafter | |
| EtherNet/ | commun... | cancel date filter | |
| EtherCAT | node 16 | display EtherCAT configuration information | |
| EtherCAT | communication port | link-off abnormality | 0x84600000 |
| EtherCAT | node 16, unit | communication synchronization abnormality | 0x85030000 |

FIG. 5

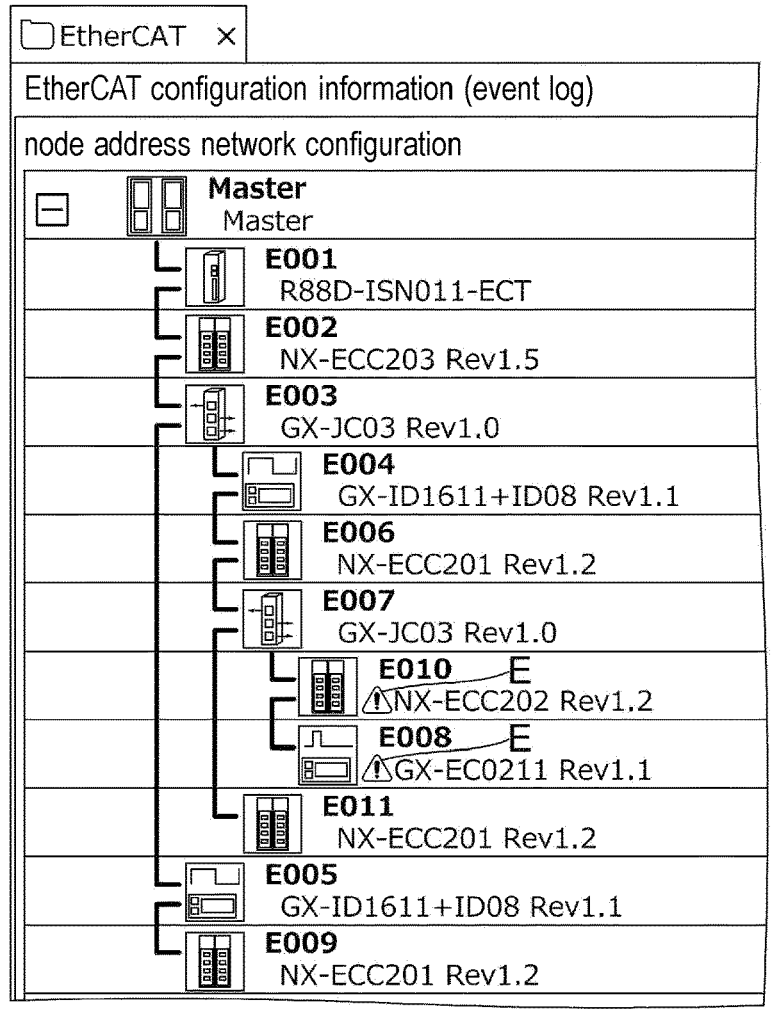

FIG. 6

(a)
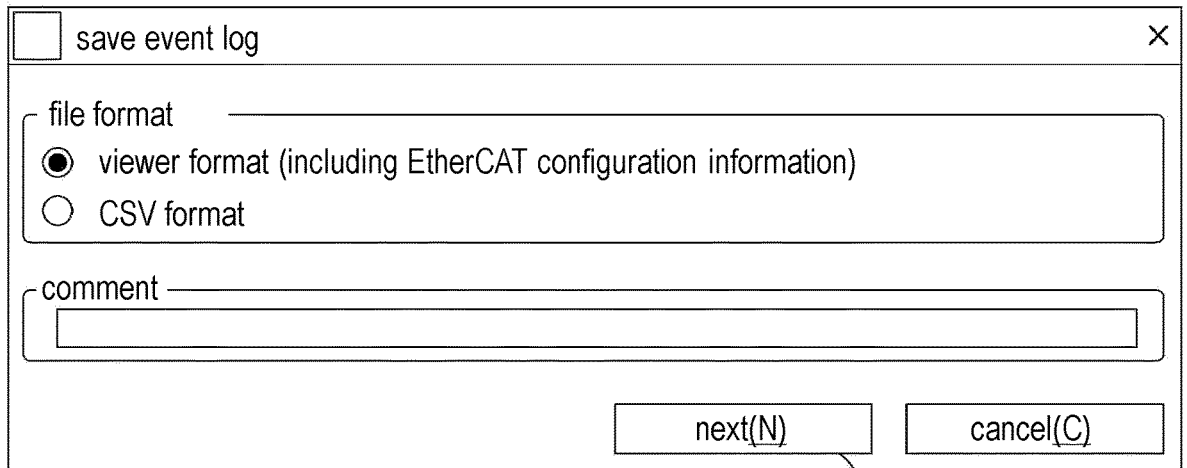
(b)
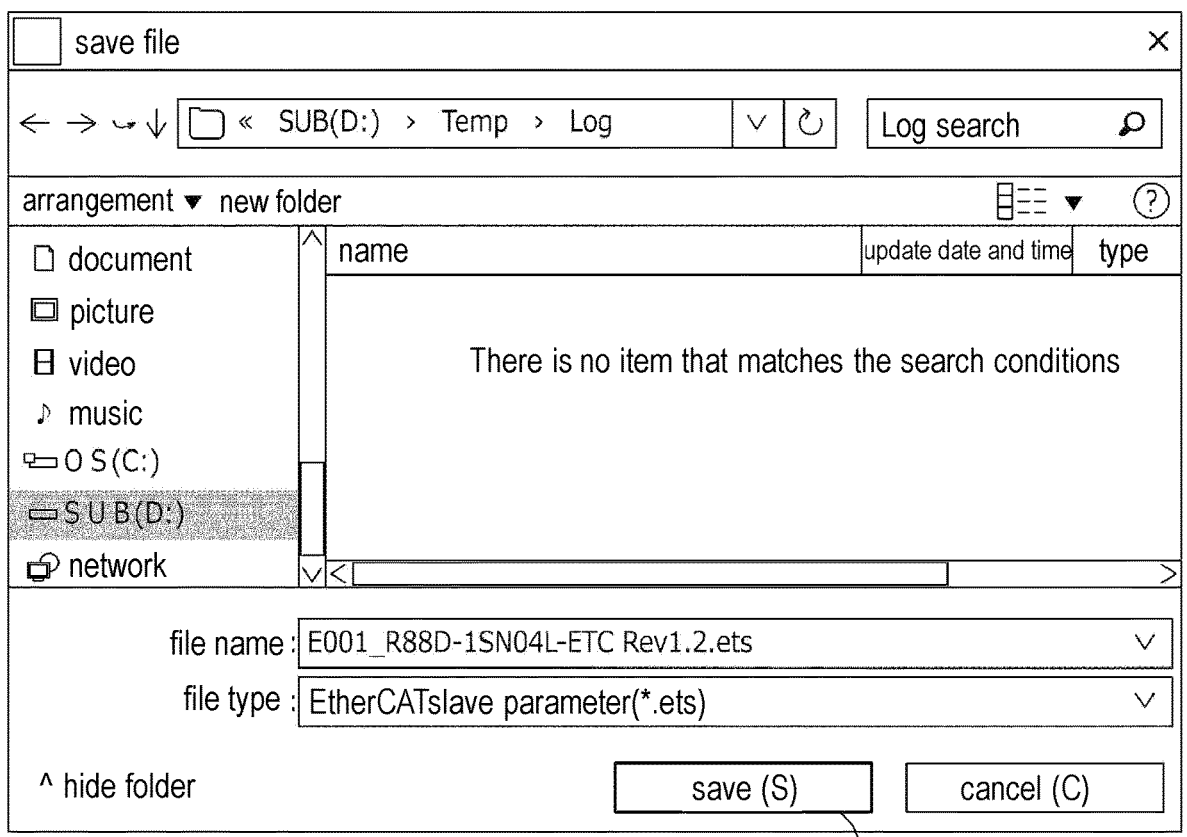
FIG. 10

FIG. 12

MANAGEMENT DEVICE, ASSISTANCE DEVICE, MANAGEMENT METHOD, AND RECORDING MEDIUM FOR CONVERTING DATA INTO VIEWABLE FORMAT

CROSS-REFERENCE TO RELATED APPLICATION

This application is a 371 application of the International PCT application serial no. PCT/JP2020/008054, filed on Feb. 27, 2020, which claims the priority benefits of Japan Patent Application No. 2019-058969, filed on Mar. 26, 2019. The entirety of each of the above-mentioned patent applications is hereby incorporated by reference herein and made a part of this specification.

BACKGROUND

Technical Field

The present invention relates to a management device, an assistance device, a management method, and a recording medium for managing a network including nodes such as a master device, a slave device, and the like.

Related Art

In factory automation (FA), control of a production equipment installed in a factory is performed by an industrial network system configured by nodes such as various slave devices performing data collection and control of the production equipment, a master device that centrally manages the multiple slave devices, and the like.

When an abnormality occurs in a production line for some reason and the production line is stopped, it is necessary to identify the abnormality location and restore the production line immediately. In response, Patent literatures 1 and 2 disclose a technique in which an event log generated in a control system is collected, and the collected event log is graphically displayed in association with a network configuration diagram of the control system.

LITERATURE OF RELATED ART

Patent Literature

Patent literature 1: Japanese Patent Laid-Open No. 2018-124696
Patent literature 1: Japanese Patent Laid-Open No. 2018-124697

SUMMARY

Problems to be Solved

The collection and analyzation of the event log are performed in a management device (a programmable terminal in Patent literatures 1 and 2) installed in a factory, but there is a case that the person used to operating the management device is not at the site. In this case, at present, the event log is converted into CSV data in the management device, and the CSV data is transmitted to a support department other than the site (such as a network designer in another office, a PLC manufacturer, or the like) to request recovery work.

However, because the CSV data is data in a simple text format, in the assistance device of the support department, the event log cannot be graphically displayed like the event log displayed in the management device at the site. Therefore, there is a case that communication between the user of the management device at the site and the user of the assistance device does not go well.

The present invention is accomplished to solve the above problems, and an objective is to provide a management device that makes it possible for a user of a device which is different from the management device to smoothly assist troubleshooting in the management device.

Means to Solve Problems

The management device according to the present invention manages a network including one or more nodes, and includes a data acquisition portion that acquires first data in binary format which indicates a state of the network and a data conversion portion that converts the first data into second data in viewer format.

In addition, preferably, in the management device, the second data is in an XML format.

In addition, preferably, in the management device, the data conversion portion removes data related to intellectual property of the network from the first data, and converts the first data from which the data related to intellectual property of the network is removed into the second data.

In addition, preferably, in the management device, the first data includes an event log in which an occurrence time point of a phenomenon occurred in the node and information identifying the phenomenon are associated.

In addition, preferably, in the management device, the first data includes state information related to a state of the node.

In addition, preferably, in the management device, the first data includes a network configuration diagram showing a connection relationship of the nodes.

An assistance device according to the present invention includes a data restoration portion that restores the second data received from the management device according to the present invention to the first data.

A management method according to the present invention manages a network including one or more nodes, and includes a data acquisition step of acquiring first data in binary format which indicates a state of the network, and a data conversion step of converting the first data into second data in viewer format.

In addition, a recording medium which is computer-readable and in which a management program is recorded also belong to the technical scope of the present invention, wherein the management program is configured for making a computer function as the management device and configured for making a computer function as the data acquisition portion and the data conversion portion.

Effect

According to the present invention, a user of a device different from the management device can smoothly assist troubleshooting in the management device.

BRIEF DESCRIPTION OF THE DRAWINGS

FIG. 3 is an example of an event log display screen displayed on the management device.

FIG. 4 is a diagram for describing narrowing down of the event log based on period.

FIG. 5 is a diagram for describing a display instruction of a network configuration diagram.

FIG. 6 is an example of the network configuration diagram displayed on the management device.

(a) and (b) of FIG. 10 are diagrams showing a dialog screen for performing an operation of converting data in binary format into data in viewer format.

Figure 11:
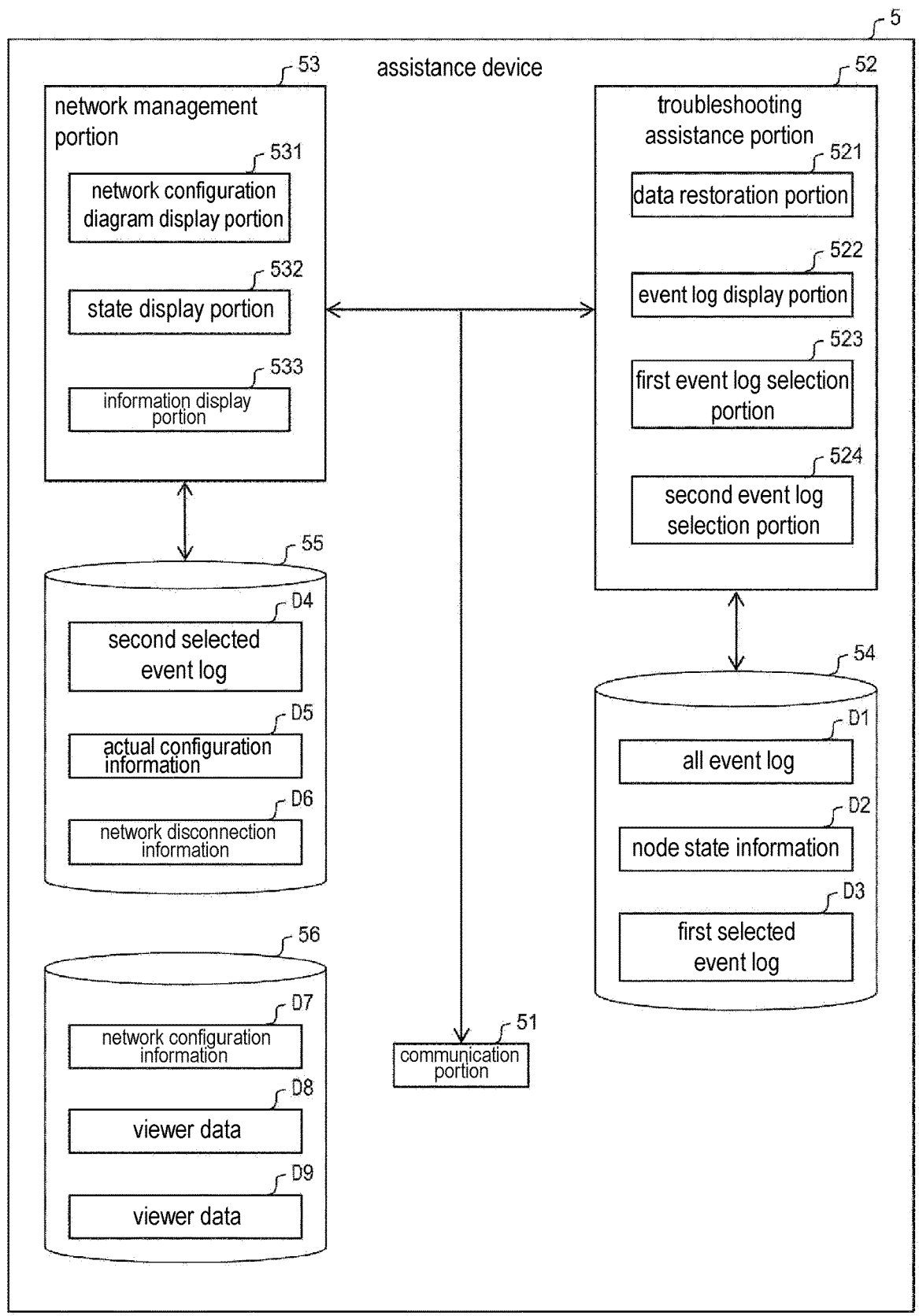

FIG. 11 is a block diagram showing a configuration of an assistance device according to an embodiment of the present invention.

Figure 12:
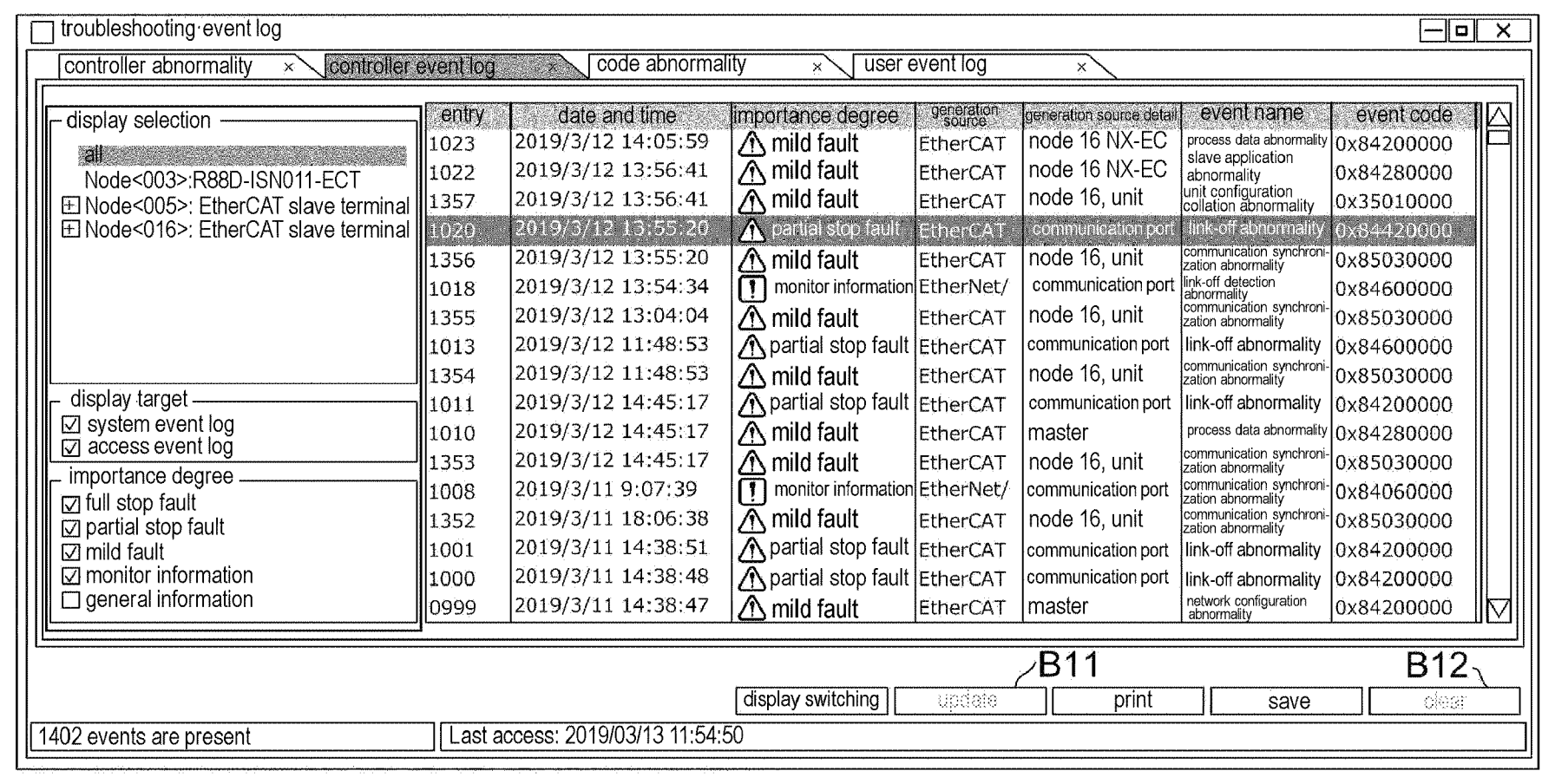

FIG. 12 is an example of an event log display screen displayed on the assistance device.

Figure 13:
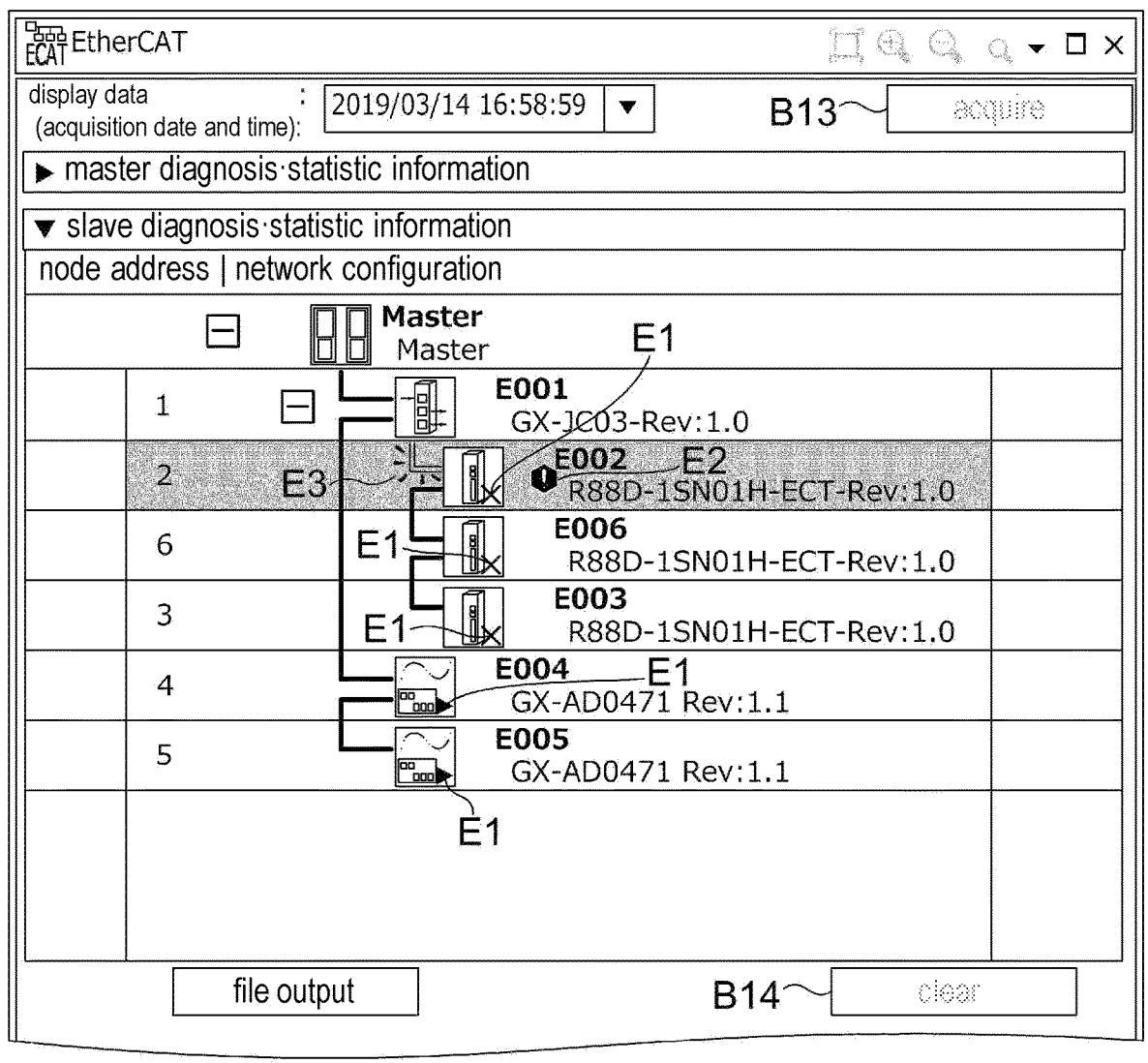

FIG. 13 is an example of a network configuration diagram displayed on the assistance device.

DESCRIPTION OF THE EMBODIMENTS

Hereinafter, an embodiment of the present invention is described with reference to the accompanying drawings. In the following embodiment, a management device in a network system conforming to the standard of Ethernet for Control Automation Technology (EtherCAT: registered trademark) is described, but the subject of the present invention is not limited thereto. The present invention can be applied to any network system including one or more nodes.

Overall Configuration of System

Figure 1:
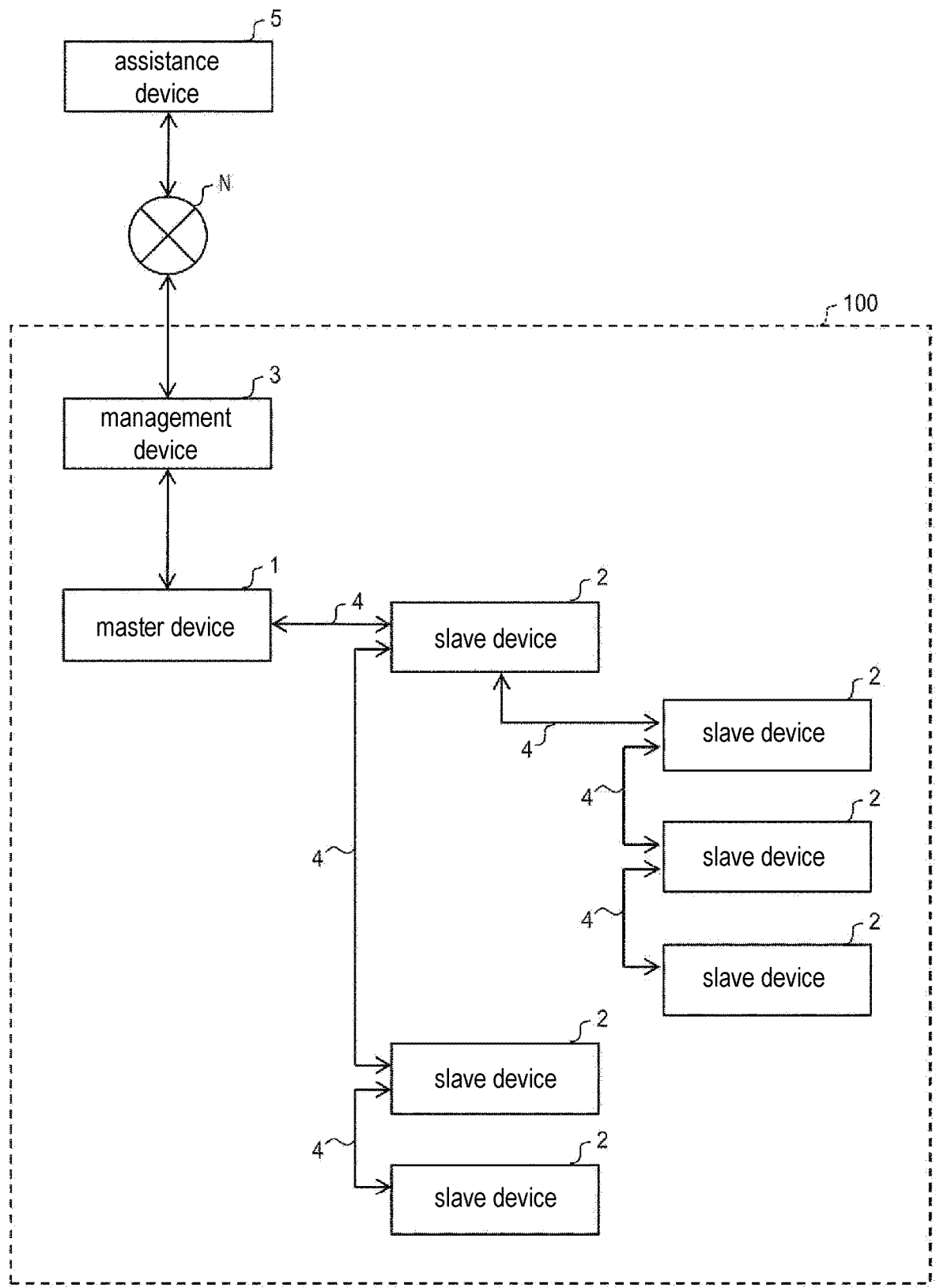
FIG. 1 is a block diagram showing a schematic configuration of an industrial network system according to an embodiment of the present invention.

FIG. 1 is a block diagram showing a schematic configuration of an industrial network system 100 according to an embodiment of the present invention. The industrial network system 100 includes a network including a master device 1 and slave devices 2 connected to the master device 1, and a management device 3 connected to the master device 1. The master device 1 and the slave devices 2 are connected by a cable 4 compatible with EtherCAT communication, and the slave devices 2 are also connected to each other by a cable 4 compatible with EtherCAT co rnu cation. The master device 1 and the management device 3 are connected by wired or wireless EtherNET (registered trademark) communication or USB communication. Furthermore, the management device 3 can communicate with an assistance device via a communication network N such as the Internet or the like.

The master device 1 is a device that centrally manages the slave devices 2, and is configured by, for example, a programmable logic controller (PLC). The master device 1 controls the slave device 2 by transmitting a control command for performing sequence control to the slave device 2, and monitors the state of the slave device 2 by receiving various data from the slave device 2.

In addition, the master device 1 records, each time a predetermined phenomenon (event) occurs in the own device, an event log in which an occurrence time point of the phenomenon and the information that identifies the phenomenon are associated in a built-in non-volatile memory. The phenomenons in the embodiment are classified into system events related to abnormalities such as a communication trouble and access events occurring by the operation from a user.

The slave device 2 is a device that performs data collection and control of the production equipment, and performs the control action of the production equipment according to the control command from the master device 1, and rewriting and return processing of the received control command. The slave device 2 includes a slave terminal, an NX unit, a CJ unit, an IO-Link device, a power source unit, a motor unit, a counter unit, an image unit, a communication unit, an I/O unit, and the like. The slave device 2 is appropriately connected to the production equipment by wire or wirelessly. The production equipment includes input devices such as sensors, push buttons, limit switches and the like, and output devices such as lamps and the like.

Similar to the master device 1, the slave device 2 records, each time a predetermined phenomenon occurs in the own device, an event log in which an occurrence time point of the phenomenon and the information that identifies the phenomenon are associated in a built-in non-volatile memory.

Additionally, the number and topology of the slave devices 2 that can be connected to the master device 1 are not particularly limited. In the embodiment, a maximum of 512 slave devices 2 can be connected to one master device 1, and any topology can be applied such as a serial topology, a ring-like topology, a tree-like topology, a star-like topology or the like according to the cooperation between the slave devices 2 or the convenience of wiring. In addition, a hub device may also be included as a node in addition to the master device 1 and the slave device 2.

Management Device

Figure 2:
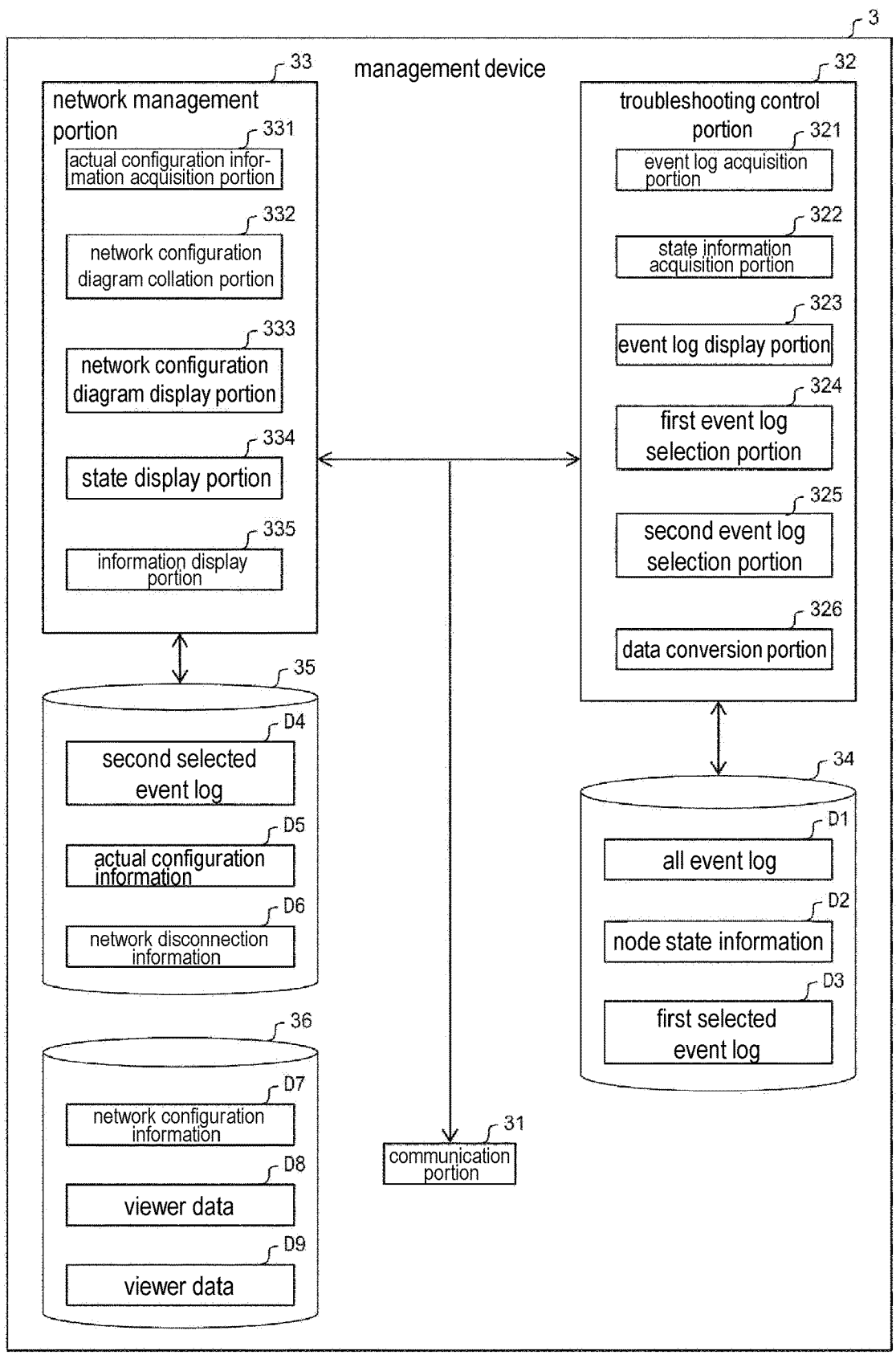
FIG. 2 is a block diagram showing a configuration of a management device according to an embodiment of the present invention.

FIG. 2 is a block diagram showing a configuration of the management device 3. The management device 3 is a computer that manages the network of the master device 1 and the slave devices 2, and can be configured by, for example, a general-purpose personal computer. The management device 3 includes, for example, a central processing unit (CPU), a main storage device (a memory), an auxiliary storage device (a hard disk, a SSD, or the like), a display device, and an input device (a keyboard, a mouse, or the like) as a hardware configuration.

In addition, the management device 3 includes a communication portion 31, a troubleshooting control portion 32, a network management portion 33, a storage portion 34 for troubleshooting, a storage portion 35 for network management, and an auxiliary storage portion 36 as function blocks. The communication portion 31, the troubleshooting control portion 32, and the network management portion 33 are implemented by reading out a management program (not shown) accommodated in the auxiliary storage device into the main storage device and executing the management program by a CPU. The management program may be recorded in a non-temporary computer-readable recording medium such as a CD-ROM or the like, or the management program may be installed in the management device 3 by causing the management device 3 to read the recording medium. Alternatively, a code of the management program may be downloaded to the management device 3 via a communication network such as the Internet or the like.

The storage portion 34 and the storage portion 35 can be set in the main storage device. In addition, the auxiliary storage portion 36 can be set in the auxiliary storage device.

The communication portion 31 is a communication unit for the management device 3 to communicate with the master device 1 and the assistance device 5. For example, the communication portion 31 has a function of switching communication protocols according to the master device 1, a function of regularly monitoring the occurring abnormality in a node, a function of performing transmission/reception processing for acquiring an event log from each node, and other functions.

The troubleshooting control portion 32 has a function of assisting the resolution of various troubles in the network including the master device 1 and the slave devices 2. In order to realize the function, the troubleshooting control portion 32 includes an event log acquisition portion 321, a state information acquisition portion 322, an event log display portion 323, a first event log selection portion 324, a second event log selection portion 325, and a data conversion portion 326.

The event log acquisition portion 321 is a function block that acquires an event log from each of the nodes, which are the master device 1 and the slave devices 2. In addition, the state information acquisition portion 322 is a function block that extracts the current state information of each node from the acquired event log. As described above, the event log in which an occurrence time point of a phenomenon occurring in the own device and the information that identifies the phenomenon are associated is recorded in each of the nodes, which are the master device 1 and the slave devices 2. The user starts up the management program and performs a predetermined operation (for example, presses a troubleshooting button), and thereby the event log acquisition portion 321 can acquire the event log from all the nodes directly or indirectly connected to the management device 3. The acquired event logs are accommodated in the storage portion 34 as an all events log D1. Furthermore, the state information acquisition portion 322 can extract the information related to the state of each node from the accommodated all events log D1. The extracted information is accommodated in the storage portion 34 as node state information D2.

Additionally, in the embodiment, the event log acquisition portion 321 may acquire all the event logs recorded in the slave devices 2, but because the event log recorded in the slave terminal, the NX unit, the CJ unit, and the IO-Link device is not the event log related to a communication abnormality described later, this event log may not be acquired. In addition, the event log acquisition portion 321 may acquire the event log whose generation source is an "EtherCAT master function module" among the event logs stored in the master device 1.

The event log display portion 323 is a function block that displays an event log list on the display device. In the embodiment, when the event log acquisition portion 321 acquires the event log from each node, the event log display portion 323 automatically displays a list of all the acquired event logs.

Figure 3:
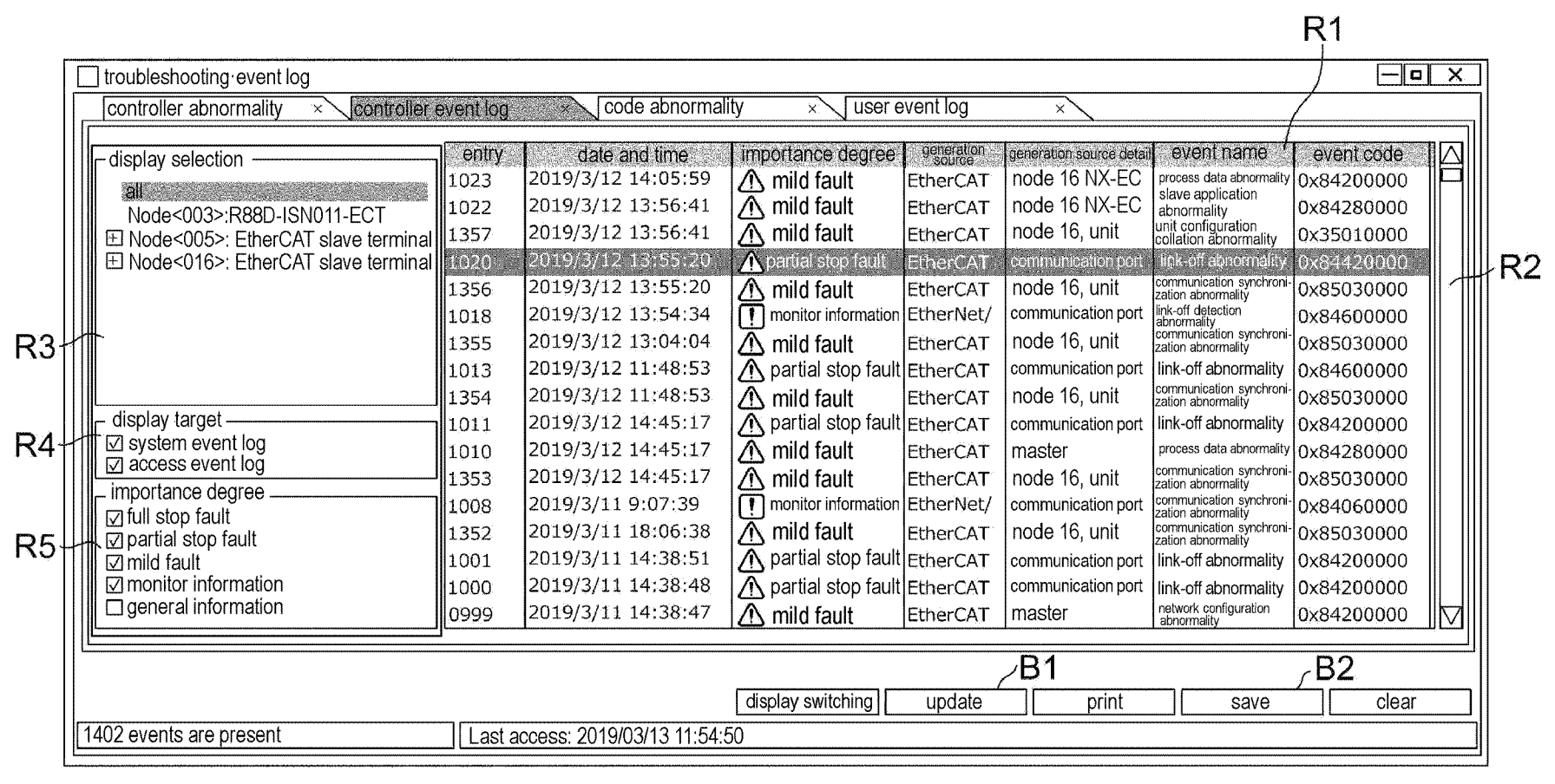

FIG. 3 is an example of a display screen of event logs. In FIG. 3, the event log list is displayed in a chronological order in a region R1, and the event log includes an entry, date and time, an importance degree, a generation source, a generation source detail, an event name, and an event code. In the embodiment, for example, a Boolean value flag indicating the presence or absence of an abnormality is set in the event log, and whether there is an occurring abnormality can be identified by the value of the flag.

The date and time is an occurrence time point of the phenomenon in each node. In the embodiment, the occurrence time point is indicated by year, month, day, hour, minute, and second, but the display mode of the occurrence time point is not limited thereto.

The entry, the importance degree, the generation source, the generation source detail, the event name, and the event code are information that identifies the phenomenon. Specifically, the entry is I/O data assigned to I/O entry mapping. The importance degree is information representing an importance degree of the phenomenon detected by each node, and the higher the importance degree, the greater the impact on the system and the higher the urgency for recovery. An example of the importance degree information is, in descending order, for example, a full stop fault, a partial stop fault, a mild fault, and the like. The generation source is information representing a node in which an occurrence of the phenomenon is detected, and is information such as EtherCAT, Ethernet, or the like according to the connection type of the node. The generation source detail is information (an ID, a node address, and the like) that identifies the node in which the phenomenon has occurred. The event name is the type of the phenomenon. The event code is a code that assigned to the phenomenon of the node in advance by the system according to the type of the phenomenon, and is indicated by 8 hexadecimal digits. Note that, the information that identifies the phenomenon is not limited thereto.

In FIG. 3, a part of 1402 event logs are displayed, and the user can browse all the event logs by operating a scroll bar R2 on the right side of the region R1. However, because it takes a lot of time to verify the event logs when there are many event logs, in the embodiment, the first event log selection portion 324 can narrow down the event logs according to filtering conditions set by the user.

Menus for setting the filtering conditions are displayed in regions R3 to R5 in FIG. 3. The user can narrow down the event log to be displayed in the region R1 by pressing an update button B1 after selecting these menus.

In the region R3, a menu for selecting a range of the nodes to be displayed in the event log list is displayed. The user can select whether to display only the master device 1 and the slave device 2 or to display the slave terminals connected to the slave device 2 as well as a list.

In the region R4, a menu for narrowing down the target to be displayed in the list according to the type of the event log is displayed. The user can select the system event log and/or the access event log.

In addition, in the region R5, a menu for narrowing down the target to be displayed in the list according to the importance degree of the event log is displayed. A full stop fault is an abnormality that makes it impossible to control the entire node, a partial stop fault is an abnormality that makes it impossible to control the entire function module of the node, and a mild fault is an abnormality that makes the control action impossible/unsustainable within the range of the function module of the node. Monitor information refers to information which is a minor abnormality in a level not affecting the control but is still recorded in the event log and notified to the user for the purpose of alerting the user not to develop the abnormality into an abnormality of the mild fault level or higher. General information refers to information which is not an abnormality but is still recorded in the event log and notified to the user.

Furthermore, in the embodiment, in addition to the above-mentioned narrowing down of the event logs, the first event log selection portion 324 can narrow down the event log related to the phenomenon occurring within a predetermined period. Specifically, as shown in FIG. 4, when the event log that is the starting point of the predetermined period is selected and right-clicked in the event log list, a context menu is displayed on the lower side. By selecting "display only events at date and time thereafter" from the context menu, the event logs can be narrowed down to only the event logs whose occurrence time point is later than the selected event log. Similarly, by selecting and right-clicking the event log that is the end point of the predetermined period, and selecting "display only events at date and time therebefore" from the context menu, the event logs can be narrowed down to only the event logs whose occurrence time point is earlier than the selected event log. Additionally, when "cancel date filter" is selected from the context menu after the event logs are narrowed down, all the event logs can be displayed again.

The first event log selection portion 324 accommodates the event logs selected from the all events log D1 in the storage portion 34 as a first selected event log D3. Thereby, the event log display portion 323 displays a list of the selected event logs based on the first selected event log D3. As a result, the event logs related to the phenomenon occurring within a predetermined period are displayed in the event log list.

The second event log selection portion 325 is a function block that selects the event log related to the phenomenon in communication abnormality from the event logs (the all events log D1 or the first selected event logs D3). Most of the phenomenons related to communication abnormality are mild fault system event logs. As described later, the selection of the event log by the second event log selection portion 325 is performed when the user instructs display of a network configuration diagram, and the selected event log is accommodated in the storage portion 35 as a second selected event log D4.

As described above, the event log acquisition portion 321, the state information acquisition portion 322, the first event log selection portion 324, and the second event log selection portion 325 respectively acquire or create the all events log D1, the node state information D2, the first selected event log D3, and the second selected event log D4 (a data acquisition step). The all events log D1, the node state information D2, the first selected event log D3, and the second selected event log D4 are data in binary format (first data), and each of the event log acquisition portion 321, the state information acquisition portion 322, the first event log selection portion 324, and the second event log selection portion 325 corresponds to the data acquisition portion described in claims. Additionally, in the specification, "acquisition" is a concept including both a mode of receiving data and the like from another device and a mode of generating the data and the like by itself. The function of the data conversion portion 326 is described later.

The network management portion 33 has a function of assisting the state management of the network by the user. In order to realize the function, the network management portion 33 includes an actual configuration information acquisition portion 331, a network configuration diagram collation portion 332, a network configuration diagram display portion 333, a state display portion 334, and an information display portion 335.

The actual configuration information acquisition portion 331 is a function block that acquires information of a network configuration of an actual machine (actual configuration information). In the embodiment, in the industrial network system 100 that is actually constructed, the master device 1 performs network scan processing to collect the information of each slave device 2 and generate the actual configuration information. The actual configuration information acquisition portion 331 receives the actual configuration information from the master device 1 and reads out the actual configuration information into the storage portion 35 as actual configuration information D5 shown in FIG. 2.

In addition, in the auxiliary storage portion 36, network configuration information D7 indicating a design network configuration created by the user is accommodated in advance as a project file. After the management program is started up, the network configuration diagram collation portion 332 reads out the network configuration information D7 into the storage portion 35 and collates the network configuration information D7 with the actual configuration information D5. If the two are consistent as a result of the collation, the network configuration diagram collation portion 332 erases the actual configuration information D5 from the storage portion 35, and accommodates only the network configuration information D7 in the storage portion 35. On the other hand, if the two are not consistent as a result of the collation, the network configuration diagram collation portion 332 erases the network configuration information D7 from the storage portion 35 and writes and saves the actual configuration information D5 over the network configuration information D7 accommodated in the auxiliary storage portion 36. Thereby, either the actual configuration information D5 or the network configuration information D7 remains in the storage portion 35.

In addition, the network configuration diagram collation portion 332 detects a disconnection position of the network by comparing the network configuration information D7 and the actual configuration information D5. The detection result is accommodated in the storage portion 35 as network disconnection information D6 shown in FIG. 2.

Additionally, the slave device 2 may be temporarily removed (disengaged) from the network for reasons such as maintenance and the like. The slave device 2 can rejoin the network after returning from maintenance. In the embodiment, the disconnection due to the temporary disengagement can be treated without determining that disconnection is caused. The information of the slave device 2 which is disengaged can be left in the actual configuration information D5 as if it remains the connection to the network.

The network configuration diagram display portion 333 is a function block that displays a network configuration diagram showing a connection relationship of the nodes. In the embodiment, as shown in FIG. 5, the user can instruct the display of the network configuration diagram by right-clicking in the event log list and selecting "display Ether-CAT configuration information" from the context menu. In response, the network configuration diagram display portion 333 graphically displays the network configuration diagram shown in FIG. 6 with reference to the actual configuration information D5 or the network configuration information D7 accommodated in the storage portion 35. In the network configuration diagram, all the nodes included in the network are indicated by icons, and the nodes are displayed as a tree. In addition, a node address and a model name are displayed in the vicinity of each icon.

Note that, the specific display mode of the network configuration diagram is not limited thereto, and any display mode is available if it enables the user to intuitively grasp the network configuration.

In addition, when the user instructs the display of the network configuration diagram, the network configuration diagram display portion 333 can display the node in which the phenomenon has occurred in a manner of being distinguishable from the node in which the phenomenon does not occur on the network configuration diagram with reference to the second selected event log D4. In the network configuration diagram shown in FIG. 6, an error icon E is displayed in the vicinity of each node at node addresses E010 and E008. Thereby, the user can easily grasp that the phenomenon has occurred in the node in which the error icon E is displayed. Therefore, by using the management device 3 according to the embodiment, the analysis work of the phenomenon occurred in the node becomes easy.

In addition, among the phenomenons that occur in the slave device 2, the communication abnormality takes time to recover, and thus the communication abnormality is important as an analysis target of the cause. Therefore, in the embodiment, the second event log selection portion 325 selects the event log in a manner that the second selected event log D4 includes only the event log related to the phenomenon of the communication abnormality. Thereby, the user can easily grasp which node has a communication abnormality within a predetermined period based on the network configuration diagram, and can efficiently perform the verification work based on the event log.

Note that, the mode for displaying the node in which the phenomenon has occurred in a manner of being distinguishable from other nodes on the network configuration diagram is not limited to the above. For example, a mode such as blinking display or highlighting display of the icon can be applied.

The state display portion 334 is a function block that displays information related to the current state of each node on the network configuration diagram in association with each node based on the node state information D2 and the network disconnection information D6. As a display mode, for example, an icon is displayed in the vicinity of the icon of the corresponding node. The type of the icon can be changed according to the content or the degree of the state.

Figure 8:
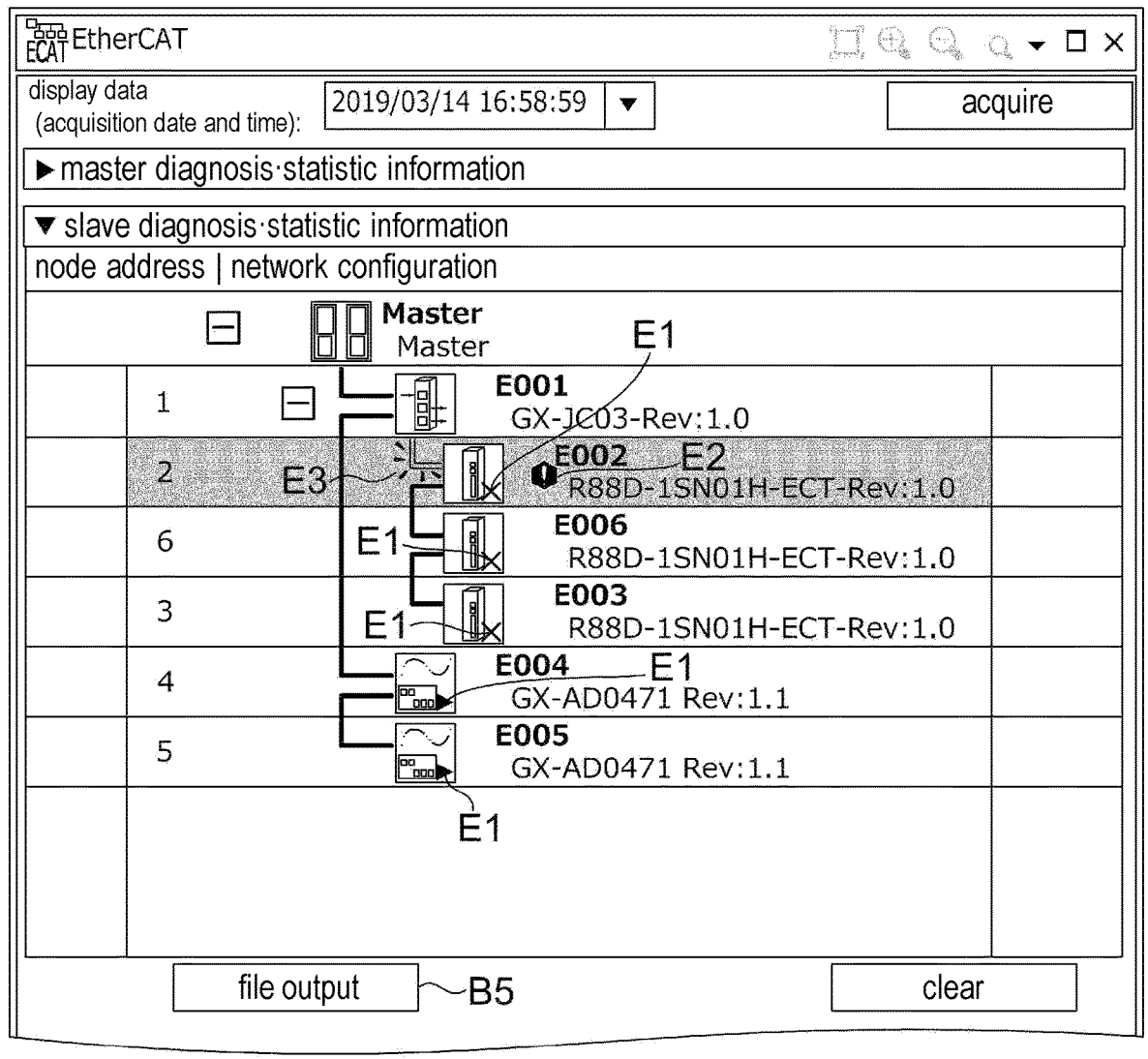
FIG. 8 is another example of the network configuration diagram.

For example, in the network configuration diagram exemplified in FIG. 8, an icon E1 indicating the state of the node is displayed in the vicinity of each node at node addresses E002 to E006. In the exemplified mode, an icon meaning a normal action is displayed at the nodes at the node addresses E004 and E005, and an icon meaning occurrence of some abnormality is displayed at the nodes at the node addresses E002, E006, and E003. Furthermore, an icon E2 indicating an occurring abnormality is displayed in the vicinity of the node at the node address E002, and a connection line E3 between the node E002 and the node E001 is displayed in a manner that the presence of the disconnection state is distinguishable. Additionally, in the mode exemplified in FIG. 8, the icon E2 is an icon meaning a partial stop fault.

Thereby, the user can easily grasp the current state of the node by the difference of the type of the displayed icon E1. In addition, the user can easily grasp that an abnormality is occurring in the node at which the icon E2 is displayed. In addition, the user can easily grasp that the communication is stopped at the position of the connection line E3 and the disconnection state is present. The communication stop position is a location having a high priority degree of necessity for restoration in the physical trouble in the network. By graphically displaying the communication stop position in the network configuration diagram, the identification of the cause location also becomes easy.

Additionally, the mode of displaying the state of the node, the mode of displaying the occurring abnormality, and the mode of displaying the disconnection state on the network configuration diagram are not limited to the above. For example, a mode such as blinking display or highlighting display of the corresponding icon or connection line can be applied.

Figure 7:
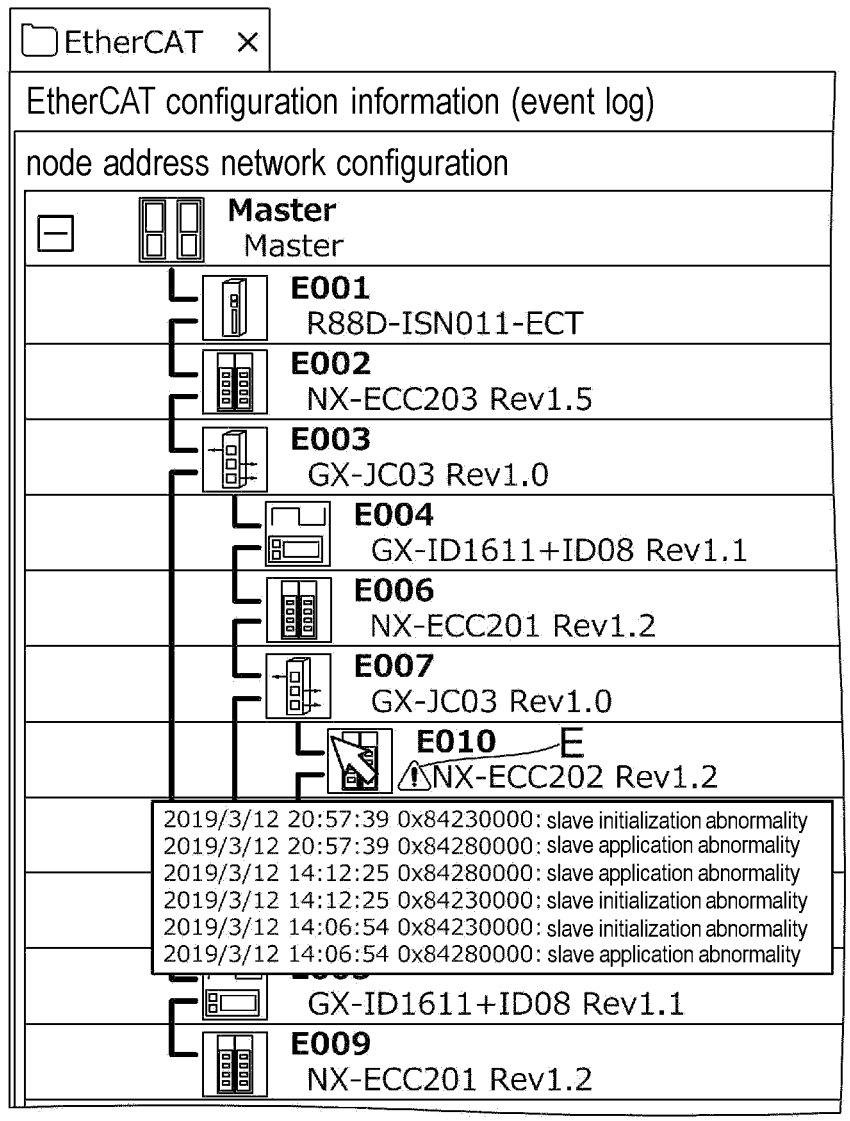
FIG. 7 is a diagram showing a state in which detailed information related to a phenomenon occurring in a certain node is displayed in a tooltip manner in the network configuration diagram.

The information display portion 335 is a function block that displays information related to a phenomenon occurred in a node that is distinguishably displayed on the network configuration diagram according to the predetermined operation on the node. For example, when the mouse is over the icon of the node at the node address E010 where the error icon E is displayed as shown in FIG. 6, the information display portion 335 acquires the event log of the node corresponding to the icon on which the mouse is over from the second selected event log D4, and displays detailed information (a list of date and time, event code, and event name) related to the phenomenon occurred within a predetermined period in the node at the node address E010 in a tooltip manner in chronological order as shown in FIG. 7. Thereby, the user can grasp what kind of phenomenon has occurred in each node by a simple operation. Therefore, the analysis work of the phenomenon occurred in the node becomes easier.

Figure 9:
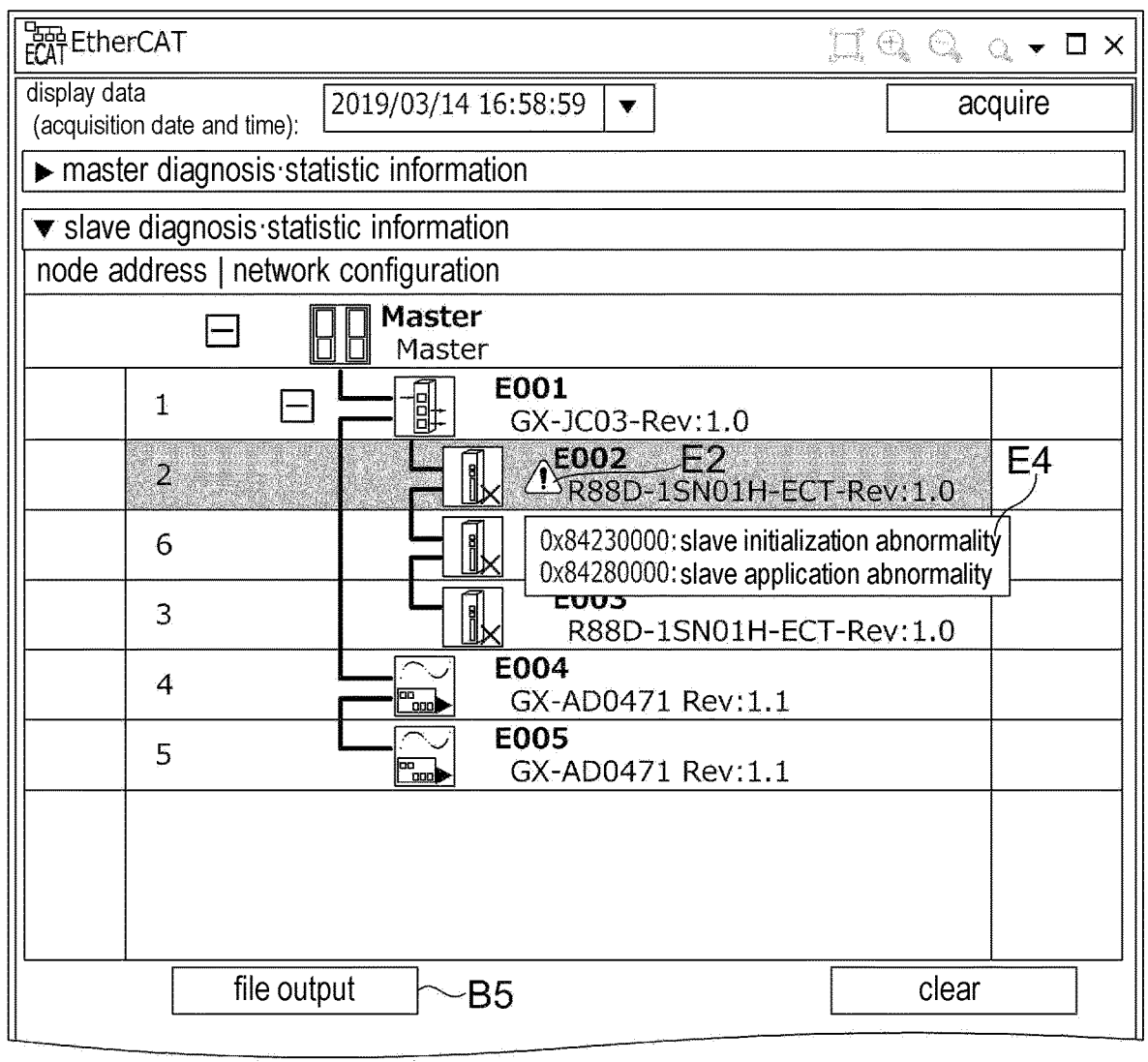
FIG. 9 is a diagram showing a state in which detailed information related to an occurring abnormality in a certain node is displayed in a tooltip manner in the network configuration diagram.

In addition, for example, when the mouse is over the icon of the node at the node address E002 where the icon E2 indicating an occurring abnormality is displayed as shown in FIG. 8, the information display portion 335 acquires the event log of the node corresponding to the icon on which the mouse is over from the all events log D1, and displays detailed information (a list of event code and event name) related to the abnormality occurring in the node in a tooltip manner as shown by the reference numeral E4 in FIG. 9. Thereby, the user can grasp what kind of abnormality is occurring in each node with a simple operation. Therefore, the analysis work of the abnormality occurring in the node becomes easier. Additionally, in the mode exemplified in FIG. 9, the icon E2 is an icon meaning a mild fault.

Additionally, the predetermined operation on the node is not particularly limited as long as it is an operation for selecting a desired node, and may be, for example, a click, a tap, or the like on the node.

As described above, the actual configuration information acquisition portion 331 and the network configuration diagram collation portion 332 respectively acquire or generate the actual configuration information D5 and the network disconnection information D6 (a data acquisition step). The actual configuration information D5 and the network disconnection information D6 are data in binary format (first data), and each of the actual configuration information acquisition portion 331 and the network configuration diagram collation portion 332 corresponds to the data acquisition portion described in claims. In addition, although omitted in FIG. 2, the function block creating the network configuration information D7 also corresponds to the data acquisition portion described in claims.

Data Conversion

As described above, in the management device 3, by the functions of the event log acquisition portion 321, the state information acquisition portion 322, the event log display portion 323, the first event log selection portion 324, and the second event log selection portion 325 of the troubleshooting control portion 32, and the actual configuration information acquisition portion 331, the network configuration diagram collation portion 332, the network configuration diagram display portion 333, and the state display portion 334 of the network management portion 33, the analysis work and the like of the phenomenon occurred in the node can be performed. However, if the person used to operating the management device 3 is not at the site, the user of the assistance device 5 connected to the management device 3 by the communication network N is requested for support.

The data (first data) indicating the network state such as the all events log D1, the node state information D2 and the like accommodated in the management device 3 is data in binary format corresponding to the management program. On the other hand, the management program is often not installed in the assistance device 5. Therefore, in the embodiment, the data accommodated in the management device 3 is converted into data in viewer format (second data) (a data conversion step) and transmitted to the assistance device 5.

For example, when the assistance device 5 is requested to troubleshoot based on the event log shown in FIG. 3, the user of the management device 3 presses a save button B2. Thereby, a dialog screen for selecting a save format of the data is displayed as shown in (a) of FIG. 10. In the dialog screen, a radio button for selecting a viewer format or a CSV format as the save format is arranged. When the viewer format is selected and a "next" button B3 is pressed, a dialog screen for selecting a save location is displayed as shown in (b) of FIG. 10. When the save location is selected and a save button B4 is pressed in the dialog screen, the data conversion portion 326 shown in FIG. 2 performs binary-to-ASCII conversion on the all events log D1 and the network configuration information D7 to convert the all events log D1 and the network configuration information D7 into viewer data D8 (second data) in a viewer format (an XML format in the embodiment), and accommodates the viewer data D8 in the auxiliary storage portion 36. The viewer data D8 can be transmitted to the assistance device 5 via the communication network N by a predetermined operation.

Alternatively, when the assistance device 5 is requested to troubleshoot based on the network configuration diagram shown in FIG. 8, the user of the management device 3 presses a file output button B5. Thereby, similar to the above, the dialog screen shown in (a) of FIG. 10 is displayed, and when the viewer format is selected and the "next" button B3 is pressed, the dialog screen shown in (b) of FIG. 10 is displayed. When the save location is selected and a save button B4 is pressed in the dialog screen, the data conversion portion 326 shown in FIG. 2 performs binary-to-ASCII conversion on the all events log D1, the node state information D2, the actual configuration information D5, the network disconnection information D6, and the network configuration information D7 to convert them into viewer data D9 (second data) in a viewer format (an XML, format in the embodiment), and accommodates the viewer data D9 in the auxiliary storage portion 36. The viewer data D9 can be transmitted to the assistance device 5 via the communication network N by a predetermined operation.

Here, it is preferable that the data conversion portion 326 removes data related to intellectual property of the industrial network system 100 from the first data in binary format, and converts the first data from which the data related to intellectual property of the network is removed into the second data in viewer format. The data related to intellectual property means confidential information that is irrelevant to troubleshooting, such as a control program, an indefinite number (a variable), and the like of each node. Additionally, when acquiring various data from the network, the event log acquisition portion 321, the state information acquisition portion 322, the actual configuration information acquisition portion 331, and the like of the management device 3 may acquire the data by excluding the data related to intellectual property. In this case, removal processing of the data related to intellectual property is unnecessary in the data conversion portion 326.

Additionally, when the CSV format is selected and the data conversion is performed in the dialog screen shown in (a) of FIG. 10, the first data in binary format is converted into data in CSV format as in the prior art.

Assistance Device 5

FIG. 11 is a block diagram showing a configuration of the assistance device 5. Similar to the management device 3, the assistance device 5 can be configured by, for example, a general-purpose personal computer. The assistance device 5 includes, for example, a central processing unit (CPU), a main storage device (a memory), an auxiliary storage device (a hard disk, a SSD, or the like), a display device, and an input device (a keyboard, a mouse, or the like) as a hardware configuration.

In addition, the assistance device 5 includes a communication portion 51, a troubleshooting assistance portion 52, a network management portion 53, a storage portion 54 for troubleshooting, a storage portion 55 for network management, and an auxiliary storage portion 56 as function blocks. The communication portion 51, the troubleshooting assistance portion 52, and the network management portion 53 are implemented by reading out a viewer program (not shown) accommodated in the auxiliary storage device into the main storage device and executing the viewer program by the CPU. The viewer program may be recorded in a non-temporary computer-readable recording medium such as a CD-ROM or the like, or the viewer program may be installed in the assistance device 5 by causing the assistance device 5 to read the recording medium. Alternatively, the code of the viewer program may be downloaded to the assistance device 5 via a communication network such as the Internet or the like.

The storage portion 54 and the storage portion 55 can be set in the main storage device. In addition, the auxiliary storage portion 56 can be set in the auxiliary storage device.

The communication portion 51 is a communication unit for the assistance device 5 to communicate with the management device 3. For example, the communication portion 51 receives the viewer data D8 and D9 transmitted from the management device 3. Additionally, the communication portion 51 is not an essential configuration, and when the assistance device 5 is not connected to the management device 3, the viewer data D8 and D9 may be received via a recording medium such as a USB memory or the like.

The troubleshooting assistance portion 52 has a function of assisting troubleshooting in the management device 3. In order to realize this function, the troubleshooting assistance portion 52 includes a data restoration portion 521, an event log display portion 522, a first event log selection portion 523, and a second event log selection portion 524. The event log display portion 522, the first event log selection portion 523, and the second event log selection portion 524 respectively have the same function as the event log display portion 323, the first event log selection portion 324, and the second event log selection portion 325 of the management device 3 shown in FIG. 2.

The network management portion 53 shown in FIG. 11 has a function for the user of the assistance device 5 to perform state management of the network. In order to realize the function, the network management portion 53 includes a network configuration diagram display portion 531, a state display portion 532, and an information display portion 533. In the network management portion 53, the network configuration diagram display portion 531, the state display portion 532, and the information display portion 533 respectively have the same function as the network configuration diagram display portion 333, the state display portion 334, and the information display portion 335 of the management device 3 shown in FIG. 2.

The data restoration portion 521 of the troubleshooting assistance portion 52 shown in FIG. 11 is a function block that restores the viewer data D8 and D9 received from the management device 3 to data in binary format.

For example, when the viewer data D8 is received, the data restoration portion 521 restores the viewer data D8 to the all events log D1 and the network configuration information D7.

The event log display portion 522 can expand the restored all events log D1 to the storage portion 54 and display an event log list shown in FIG. 12 on the display device of the assistance device 5. The event log list shown in FIG. 12 has the same graphical layout as the event log list shown in FIG. 3, and also includes non-text information such as an icon indicating an error and the like. Additionally, because the assistance device 5 does not include a network event log collection function, an update button B11 and a clear button B12 cannot be pressed.

In the event log list shown in FIG. 12, the operation of narrowing down the event log as shown in FIG. 4 and FIG. 5 can be performed by the first event log selection portion 523 and the second event log selection portion 524. In addition, by the network configuration diagram display portion 531 and the information display portion 533, the network configuration diagram as shown in FIG. 6 can also be displayed graphically, and detailed information related to the phenomenon occurred in the node corresponding to the icon on which the mouse is over can also be displayed in a tooltip manner as shown in FIG. 7.

Alternatively, when the viewer data D9 is received, the data restoration portion 521 restores the viewer data D9 to the all events log D1, the node state information D2, the actual configuration information D5, the network disconnection information D6, and the network configuration information D7.

Based on the restored node state information D2 and network disconnection information D6, the state display portion 532 can display information related to the current state of each node on the network configuration diagram in association with each node as shown in FIG. 13. The network configuration diagram shown in FIG. 13 has the same graphical layout as the network configuration diagram shown in FIG. 8, and also includes non-text information such as the icon E1 of each node, the icon E2 indicating an occurring abnormality, the connection line E3, and the like. Additionally, because the assistance device 5 does not have a function of extracting the state information of each node of the network, the acquisition button B13 and the clear button B14 cannot be pressed.

In addition, when the mouse is over the icon indicating the node in the network configuration diagram shown in FIG. 13, similar to the screen shown in FIG. 9, detailed information related to the abnormality occurring in the node on which the mouse is over can also be displayed in a tooltip manner by the information display portion 533.

As described above, in the assistance device 5, by restoring the viewer data D8 and D9 in viewer format, the event log list and the network configuration diagram can be graphically displayed in the same manner as in the management device 3. Therefore, because the user of the assistance device 5 can share the screen in substantially the same display mode with the user of the management device 3, troubleshooting in the management device 3 can be smoothly assisted only by voice conversation such as telephone calls or the like even without using a remote desktop function.

Furthermore, in the embodiment, the data conversion portion 326 converts the first data in binary format from which the data related to intellectual property of the network is removed into the second data in viewer format. Therefore, the request of troubleshooting assistance can be performed without leaking confidential information to the assistance device 5.

Additional Notes

Although the embodiment of the present invention is described above, the present invention is not limited to the above embodiment, and various modifications can be made without departing from the gist thereof. For example, a form obtained by appropriately combining technical mechanisms disclosed in the above embodiment also belongs to the technical scope of the present invention.

In the above embodiment, the second data to be transmitted to the assistance device 5 is in an XML format, but the present invention is not limited thereto. The viewer format means a format in which the first data in binary format such as the event log list, the network configuration diagram and the like can be graphically displayed in a display mode equivalent to that in the management device 3 in a device in which a management program is not installed.

Note that, the display mode in the assistance device 5 and the display mode in the management device 3 do not have to be exactly the same, and a slight difference may be present between the two as long as the user of the assistance device 5 can smoothly assist.

In addition, in the above embodiment, the all events log D1, the node state information D2, the first selected event log D3, the second selected event log D4, the actual configuration information D5, the network disconnection information D6, and the network configuration information D7 are converted to the data in viewer format (the second data), but the data to be converted (the first data) is not particularly limited as long as it is data in binary format indicating the state of the network.

What is claimed is:

1. A system for monitoring error state of connection between a plurality of nodes in an industrial network, comprising:
   an assistance device, coupled to a network; and
   a management device, coupled to the assistance device through the network and managing the industrial network comprising the plurality of nodes communicatively coupled to each other, wherein the nodes comprise a master device connected to the management device and a slave device connected to the management device through the master device, comprising:
   a processor, configured to:
      acquire first data in binary format which includes error state of connection between the nodes in the industrial network; and
      in response to a detection of a request from the assistance device connected to the management device via the network different from the industrial network to troubleshoot the error state of connection between the nodes in the industrial network, convert the first data into second data in viewer format that graphically present the error state of connection between the nodes in the industrial network, and transmit the second data to the assistance device via the network, wherein the management device is installed with a management program for processing the first data in binary format, and the assistance device is not installed with the management program and incapable of processing the first data in binary format,
wherein the assistance device restores the second data received from the management device to the first data.

2. The system according to claim 1, wherein the second data is in an XML format.

3. The system according to claim 1, wherein the processor is further configured to remove data related to intellectual property of the industrial network from the first data, and converts the first data from which the data related to intellectual property of the industrial network is removed into the second data.

4. The system according to claim 1, wherein the first data comprises an event log in which an occurrence time point of a phenomenon occurred in the node and information identifying the phenomenon are associated.

5. The system according to claim 1, wherein the first data comprises state information related to a state of the node.

6. The system according to claim 1, wherein the first data comprises a network configuration diagram showing a connection relationship of the node, wherein the network configuration diagram is collected from the slave device by the master device.

7. A management method for monitoring error state of connection between a plurality of nodes in an industrial network through a management device coupled to an assistance device through a network different from the industrial network, wherein the nodes comprise a master device and a slave device connected to the master device, comprising:
a data acquisition step of acquiring first data in binary format which indicates a state of the industrial network;
a data conversion step of converting, in response to a detection of a request from the assistance device that is connected to the industrial network through a management device to troubleshoot the error state of connection between the nodes in the industrial network, the first data into second data in viewer format that graphically present the error state of connection between the nodes in the industrial network, and transmit the second data to the assistance device via a network different from the industrial network through the management device, wherein the management device is installed with a management program for processing the first data in binary format, and the assistance device is not installed with a management program for processing the first data in binary format; and
restoring the second data received from the management device to the first data by the assistance device.

8. An non-transitory computer readable recording medium, storing the management program including a plurality of instructions that causes, when the management program is loaded, a computer to function as the management device according to claim 1.

9. The system according to claim 2, wherein the data conversion portion removes data related to intellectual property of the industrial network from the first data, and converts the first data from which the data related to intellectual property of the industrial network is removed into the second data.

10. The system according to claim 2, wherein the first data comprises an event log in which an occurrence time point of a phenomenon occurred in the node and information identifying the phenomenon are associated.

11. The system according to claim 3, wherein the first data comprises an event log in which an occurrence time point of a phenomenon occurred in the node and information identifying the phenomenon are associated.

12. The system according to claim 2, wherein the first data comprises state information related to a state of the node.

13. The system according to claim 3, wherein the first data comprises state information related to a state of the node.

14. The system according to claim 4, wherein the first data comprises state information related to a state of the node.

15. The system according to claim 2, wherein the first data comprises a network configuration diagram showing a connection relationship of the nodes.

16. The system according to claim 3, wherein the first data comprises a network configuration diagram showing a connection relationship of the nodes.

17. The system according to claim 4, wherein the first data comprises a network configuration diagram showing a connection relationship of the nodes.

18. The system according to claim 1, wherein the slave device is coupled to a production equipment and is configured to collect data and control of operation of the production equipment.

* * * * *